(12) United States Patent
Alpert et al.

(10) Patent No.: US 12,181,994 B2
(45) Date of Patent: Dec. 31, 2024

(54) MULTI-LEVEL POWER MANAGEMENT OPERATION FRAMEWORK

(71) Applicant: TEXAS INSTRUMENTS INCORPORATED, Dallas, TX (US)

(72) Inventors: Yaron Alpert, Hod Hasharon (IL); Alon Srednizki, Gedera (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/390,126

(22) Filed: Jul. 30, 2021

(65) Prior Publication Data

US 2023/0031805 A1 Feb. 2, 2023

(51) Int. Cl.
*G06F 11/30* (2006.01)
*G06F 1/3203* (2019.01)
*G06F 1/3234* (2019.01)
*G06F 11/34* (2006.01)

(52) U.S. Cl.
CPC ........ *G06F 11/3062* (2013.01); *G06F 1/3203* (2013.01); *G06F 11/3495* (2013.01)

(58) Field of Classification Search
CPC . G06F 11/3062; G06F 1/3203; G06F 11/3495
See application file for complete search history.

(56) References Cited

U.S. PATENT DOCUMENTS

| | | | | |
|---|---|---|---|---|
| 8,086,885 B2* | 12/2011 | Vaajala | ............... | G06F 1/3203 713/322 |
| 2006/0123252 A1* | 6/2006 | Vaidya | ............... | G06F 1/3228 713/300 |
| 2008/0082844 A1* | 4/2008 | Ghiasi | ............... | G06F 1/3203 713/323 |
| 2009/0089782 A1* | 4/2009 | Johnson | ............... | G06F 1/3203 718/100 |
| 2009/0309243 A1* | 12/2009 | Carmack | ............... | G06F 1/3293 257/798 |
| 2012/0204042 A1* | 8/2012 | Sistla | ............... | G06F 1/3203 713/320 |
| 2014/0365787 A1* | 12/2014 | Sagar | ............... | G06F 1/3287 713/300 |
| 2015/0095666 A1* | 4/2015 | Ananthakrishnan | .... | G06F 1/206 713/300 |
| 2016/0266941 A1* | 9/2016 | Sistla | ............... | G06F 9/5094 |
| 2021/0382539 A1* | 12/2021 | Suryanarayana | ......... | G06F 8/65 |
| 2021/0397476 A1* | 12/2021 | Liu | ............... | G06F 9/4893 |

* cited by examiner

*Primary Examiner* — Phil K Nguyen
*Assistant Examiner* — Gayathri Sampath
(74) *Attorney, Agent, or Firm* — Mandy Barsilai Fernandez; Frank D. Cimino

(57) ABSTRACT

A processor in a device is configured to access a power policy for the device, where the power policy indicates a relationship between power consumption by the device and another performance variable of the device. The processor is also configured to produce an operating point for the device based at least in part on the power policy. The processor is also configured to provide information regarding the operating point to a management entity that manages the device.

22 Claims, 3 Drawing Sheets

MULTI-LEVEL POWER MANAGEMENT OPERATION FRAMEWORK

BACKGROUND

Device power management is the process of configuring, monitoring, and maintaining the power that enables a device to provide its functional capabilities. Some computing devices, particularly high-end devices such as smartphones or laptop computers, use power operation profiles. These profiles create a fixed set of operating conditions for the device (e.g., sleep mode, hibernate mode, active mode, etc.). Users may choose among the different power operation profiles. Other devices, such as low-end devices that have fewer computing capabilities (e.g., Internet of things (IoT) devices), manage power and other operating conditions without user input.

SUMMARY

In accordance with at least one example of the description, a method includes creating a power policy for a device, where the power policy indicates a relationship between power consumption by the device and another performance variable of the device based at least in part on a performance indicator related to the power consumption. The method also includes determining a power policy parameter based at least in part on the relationship between the power consumption and the another performance variable reflected by the performance indicator. The method includes applying the power policy parameter to the device.

In accordance with at least one example of the description, a method includes creating a power policy for a device, where the power policy indicates a relationship between power consumption by the device and another performance variable of the device. The method also includes generating an event at the device, where the event indicates that the power consumption or the another performance variable has reached a predetermined threshold. The method also includes transmitting a notification of the event to an entity that manages the device.

In accordance with at least one example of the description, a processor in a device is configured to access a power policy for the device, where the power policy indicates a relationship between power consumption by the device and another performance variable of the device. The processor is also configured to produce an operating point for the device based at least in part on the power policy. The processor is also configured to provide information regarding the operating point to a management entity that manages the device.

DETAILED DESCRIPTION

Figure 1:
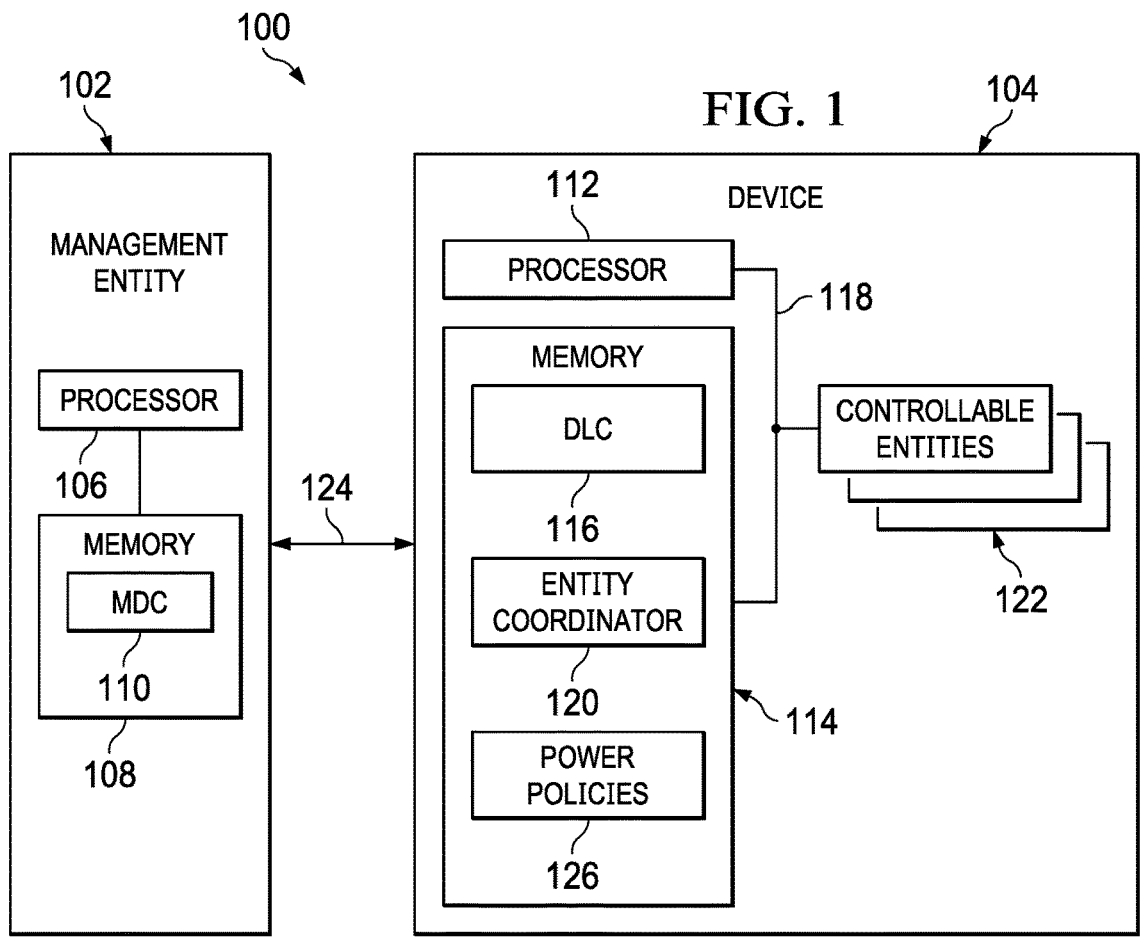
FIG. 1 is a block diagram of a system for power management in accordance with various examples.

Some device manufacturers include in their devices power operation profiles that a user may select to manage the power consumption and other performance of the device. These profiles are often set during the production of the device, and the only user involvement is selecting among the pre-set profiles (e.g., sleep mode, hibernate mode, etc.). More complex devices (such as a smartphone) may provide a user with additional tools to control some parameters of the operation of the device (e.g., speed, bandwidth, etc.) based on the power consumption. In low-end devices that have fewer computing capabilities (such as sensors, lights, cameras, smart devices, home automation devices, etc.), the device manufacturers do not provide a way for the user to set interactive power operation profiles or to manage and optimize the power consumption of the device while maintaining target operation functionalities. Optimizing the short and long-term power consumption for a low-end computing device is too complex for users.

In examples herein, a management operation framework enables a user to predict and dynamically control device power consumption based on power policy parameters and performance characteristics embedded at the device manufacturer level (e.g., a power policy). One or more of the following components enable interaction between a user and the device: interactive power policy application programming interfaces (APIs); power policy key performance indicators (KPIs), also referred to herein as performance indicators; embedded power policy coordinators; and local/remote event and action generation. Each of these components is now described in turn.

The interactive power policy APIs include a power policies parameters and boundary selection API, which allows a user to select between different power policies for managing and optimizing the power consumption-related parameters of the device while also maintaining the needed functionality of the device. The interactive power policy APIs also include prediction methodology. Prediction methodology helps to predict power consumption and power consumption-related performance based on power policy query APIs. The power policy query APIs allow a user to query how performance of the device (e.g., power consumption and power consumption-related operation profiles) may be altered based on a modification to a specific interactive power policy. The interactive power policy APIs also include monitoring methodology based on power policy reporting APIs, where embedded entities in the device may provide status, events, and specific power consumption data to the user. This data may be provided on-demand or based on the triggering of an event.

The responses to power policy queries may contain specific power policy KPIs. The KPIs may reflect short and long-term impacts on power consumption and power consumption-related performance of the device. The KPIs may indicate how changes to the power policy parameters or performance characteristics of the device (e.g., speed, throughput, transmit power, running services, responsiveness, processing accuracy, peripheral handling, sensor monitoring, etc.) affect power consumption of the device.

In some examples, one or more embedded power policy coordinators collect the device power policy and generate power policy parameters for the device. The power policy parameters include operating points, envelopes, or boundaries for performance characteristics, such as minimum speed or throughput, maximum power consumption, minimum or maximum responsiveness, minimum processing accuracy, or any other parameters, limits, or boundaries for any other performance characteristics. Power policy coordinators are also responsible for generating reports, generating KPIs, generating responses to queries, and generating responses to events.

In some examples, local/remote event and action generation includes providing a visual or logical notification to a user regarding power consumption or a user query. Event/action generation also includes providing notifications to a local or remote management entity. In some examples herein, a multi-device coordinator may manage a number of controlled devices and coordinate power policies for each individual device and/or across multiple devices. The power policy management activities may therefore be split across several devices. Different devices may be responsible for power policy management of different components or subsystems in some examples.

In examples herein, a user may be made aware of how certain actions impact power consumption and other power policy parameters of the device. The user may then decide, based at least in part on the power policy setting, which actions to take based on these parameters. The user may be notified of how proposed actions affect passive components, microcontroller power versus frequency and responsiveness, energy loss from leakage, voltage drop, temperature, etc. Also, the user may be notified of how proposed actions affect active power policy parameters such as power versus accuracy, frequency of data collection, transmit power versus transmit range, connectivity topology, current running services, speed, throughput, responsiveness, processing accuracy, peripheral handling, and sensor monitoring. The user may be notified with KPIs, scoring criteria, data, graphs, tables, or any other suitable feedback.

FIG. 1 is a block diagram of a system 100 for power management in accordance with various examples herein. In one example, system 100 is a home automation system, where a management entity (such as a hub or access point) manages multiple home automation devices, such as sensors, lights, cameras, speakers, etc. In another example, system 100 is a network computing system, where a server manages the power consumption and operating conditions of multiple client devices, which may be located remotely from one another and/or remotely from the server. System 100 includes a management entity 102 and a device 104. Management entity 102 includes a processor 106, memory 108, and multi-device coordinator (MDC) 110 within memory 108. MDC 110 may include executable code in one example. When executed by processor 106, the executable code performs the actions of MDC 110 described herein. Device 104 includes processor 112, memory 114, and device level coordinator (DLC) 116. Device 104 also includes a bus 118, an entity coordinator 120, and one or more controllable entities 122. Management entity 102 may communicate with device 104 via link 124, which may be a wired or wireless link 124. DLC 116 and entity coordinator 120 may be stored within memory 114. DLC 116 and entity coordinator 120 may each include executable code in one example. When executed by processor 112, the executable code performs the actions of DLC 116 and/or entity coordinator 120 described herein. One or more power policies 126 may also be stored in memory 114. In other examples, more than one device 104 may be present in system 100.

Processor 106 and/or 112 may be a central processing unit (CPU), a graphics processing unit (GPU), a microprocessor, a microcontroller, or any other component for performing the operations described herein. Memory 108 and/or 114 may be a hard drive, a solid-state drive (SSD), flash memory, random access memory (RAM), or other suitable memory device. Memory 108 and/or 114 may also include multiple memory devices or chips in some examples. Bus 118 couples components of device 104 to one another for communication between components.

Device 104 may be any type of computing device. In some examples, device 104 is a low-end computing device, such as an IoT device. Device 104 may be, for example, a sensor, light, camera, thermostat, audio device, smart plug, display, smart meter, or other home automation device. Device 104 may be a medical device in some examples. Device 104 may be embedded within, or be a component of, a larger device in some examples. Management entity 102 may be a wired or wireless management device that communicates with one or more devices 104 and provides management capabilities for the devices 104. A user or application may communicate with one or more devices 104 via management entity 102. A user or application may also directly manage a device 104 without the use of an intermediate device like management entity 102 in some examples.

In one example operation, the coordinators in multiple levels (e.g., MDC 110 and DLC 116) provide a user or application with the ability to dynamically select power policies 126 for device 104 and also understand how the selection affects the power policy parameters and performance characteristics of the device 104. In one example, a first power policy 126 has a low response time but consumes less power. A second power policy 126 has a fast response time and consumes more power. The power policies 126 may have constraints as well. One constraint may be that the power policy 126 maintains a certain throughput regardless of power consumption. Another constraint may be that a certain power consumption is maintained regardless of throughput. Another constraint may be that a certain response time is maintained. Any constraints or boundaries of the performance of device 104 may be implemented in some examples. A coordinator, such as MDC 110 or DLC 116, uses the power policy 126 to enforce the performance boundaries set by the power policy 126. Entity coordinator 120 in device 104 may collect the power policy 126 and produce an operating point for device 104 to maintain the performance boundary set by the power policy 126. The operating point, as used herein, is the collection of specific operating details of the device 104, such as the speed, frequency, response time, throughput, power consumption, transmit time, transmit range, receive time, and other variables. The operating point or other information regarding the operation of device 104 may be provided to MDC 110 or another component of management entity 102 in one example.

Power policies 126 may be adjusted based on KPIs. Users may query a power policy 126 using a power policy query API. Any type of interface, control, or input device may be used by a user to query a power policy 126. Also, any type of feedback may be provided to the user regarding the query, such as text, images, physical feedback, lights, or other types of notifications. A boundary of the power policy 126 may be changed based on a user query. In an example, a user may want to know what kind of throughput and responsiveness (or other performance characteristics) may be achieved for a device 104 if a certain power consumption is maintained. The user can send a query using the power policy query API. The query may be provided to entity coordinator 120 via DLC 116. The user may enter the query using DLC 116 of device 104 or using MDC 110 of management entity 102. Responsive to the query, entity coordinator 120 may generate an analysis for the user. The analysis may provide information to the user regarding the query. The analysis may be provided to the user via any suitable interface. The analysis can include text, images, audio, or video feedback. As one example, the user interface may include controls that the user can manipulate to alter one or more variables. The user may adjust one or more variables and see the effect that adjustment has on other variables based on the power policy. In one example, the analysis may provide projected performance results for device 104 if a certain change is made to device 104. In another example, the analysis may alert the user of the change's effect on power consumption of device 104. In another example, the analysis may provide the user the effect of the proposed change on other variables, such as throughput, response time, transmit or receive time, transmit or receive power, or the effect on other running processes. A user interface may allow a user to manipulate a slider, knob, dial, or other mechanism to change one or more variable and see the effect that change has on other variables. Queries such as this provide a usable interface for the user, and provides results to the user so the user does not have to consult graphs, charts, tables, or perform complex calculations. The responses to the queries provide the user with results that the user can understand.

In another example, a user may submit a query using MDC 110 of management entity 102 regarding performance results for a number of devices 104 managed by management entity 102. For example, management entity 102 may be a remote device management server that manages multiple devices 104. A user may submit a query regarding the effect on the total power consumption of all devices 104 (or a subset of devices 104) responsive to a change in performance requested by the user. MDC 110 in management entity 102 coordinates with each DLC 116 in each device 104 to retrieve information regarding power consumption, power policy parameters, and the related operation profile from each device 104. MDC 110 or another component in management entity 102 may collect and compile the information from each device 104 and present the information to the user via any feedback technique as described above. For example, management entity 102 may provide the user a numerical value or score regarding the power consumption/related operation profile and verify if the user wants to proceed with the change. In another example, management entity 102 may provide the user with a yes or no answer as to whether the current power policy 126 can achieve the user's request. In another example, management entity 102 may implement the requested change if the change falls within the boundaries of current power policy 126. If a different power policy 126 is needed to implement the user's request, management entity 102 may notify the user and ask the user to accept the policy change. In another example, management entity 102 may notify a user of a length of time that the change may be implemented while staying within the bounds of the current power policy 126. In another example, management entity 102 may suggest settings to the user, such as a setting that achieves the fastest throughput or a setting that achieves the lowest power consumption. Management entity 102 may also provide multiple suggestions to the user to allow the user to select an appropriate setting. Any other suitable responses regarding the user's query may be provided by management entity 102.

In another example, a remote device management server could include an MDC 110, and manage a number of devices 104 as client devices. Power may be increased at the remote device management server, resulting in more data transmitted with a higher signal to noise ratio. Alternatively, transmission time and power consumption of the devices 104 may be shortened. In another example, the remote device management server may transmit with higher power, increasing the power consumption at the remote device management server side but reducing power consumption at devices 104. Therefore, optimization of power consumption or other power policy parameters may be performed not just at the device level but also at a system level in some examples.

In some examples, the multi-level coordinators such as MDC 110 and DLC 116 enable splitting the operation and handling of power policy management activities between several different device manufacturers and chip providers. In some examples, different coordinators are responsible for different hardware components and/or subsystems. For example, MDC 110 may be responsible for a subset of devices 104 in a system, while other devices 104 manage power policy with internal device-level DLCs. In another example, multiple management entities 102 may be used in a system, with each management entity 102 responsible for managing power policies for a subset of devices 104 within the system. In another example, certain device types or classes may be managed by different management entities 102. In another example, devices 104 may be divided into separate power domains, with different rules, managers, and policies used to manage each power domain.

Entity coordinator 120 communicates with controllable entities 122 in device 104 to respond to policy queries from a user. The controllable entities 122 provide information to entity coordinator 120 regarding power consumption or other metrics. The controllable entities 122 may be any hardware or software components that are monitored and managed by entity coordinator 120. The controllable entities 122 may be adjusted by the entity coordinator 120 to maintain operation within the current power policy 126, or to provide the performance requested by the user. For example, controllable entities 122 may be processors, controllers, transmitters, receivers, memory, sensors, indicators, services, or any other component of device 104. Entity coordinator 120 communicates and/or manages controllable entities 122 and determines or collects KPIs regarding controllable entities 122. With these KPIs and other information, entity coordinator 120 may manage device 104 within the active power policy 126 and also respond to queries or events.

Another aspect of system 100 is local/remote event and action generation. Events may occur in system 100 for a variety of reasons. A number of actions may also be taken in response to events. For example, an event may occur if device 104 is operating near a boundary or limit of a power policy parameter within a specific power policy 126 (e.g., speed, power consumption, throughput, responsiveness, etc.). Entity coordinator 120 may be monitoring operating conditions and comparing those conditions to the boundaries of the power policy 126. If an operating condition, such as power consumption or an operation profile, nears or exceeds a boundary or a predetermined threshold, an event may be generated. The event may be reported to a user and/or management entity 102. The report may indicate that device 104 may exceed the boundary of the power policy 126 for a limited amount of time, in one example. The report may indicate that device 104 may not exceed the boundary, but the user may update to a new power policy 126 in another example. The report may indicate that the user may cross the boundary, but also alert the user of the consequences of crossing the boundary in another example. In response to receiving the event, the user or another entity may respond to the event with a query or command to alter the power policy 126, switch to a new power policy 126, or exceed a boundary of the power policy 126. Other options may be available to the user in other examples.

KPIs provide the user insight into the performance of device 104 and the implication of the user's actions. KPIs may include battery life; peak, average, or operation envelope power consumption limitation; peak, average, or operation envelope values of other variables (e.g., power policy parameters such as transmit time, power versus accuracy, frequency of data collection, transmit power versus transmit range, connectivity topology, current running services, speed, throughput, responsiveness, processing accuracy, peripheral handling, sensor monitoring, etc.); and/or power/ service degradation. KPIs are used to reflect the current and/or expected power consumption with respect to the current operation profile of the device 104, or the current and/or expected values of other variables as described above. KPIs may be used to detect, identify, and classify relationships between power consumption-related performance variables. KPIs may reflect short term or long term power consumption-related performance indicators in some examples. KPIs may reflect both regular and abnormal events. In some examples, KPIs reflect the relationship between power consumption and other performance variables.

Figure 2:
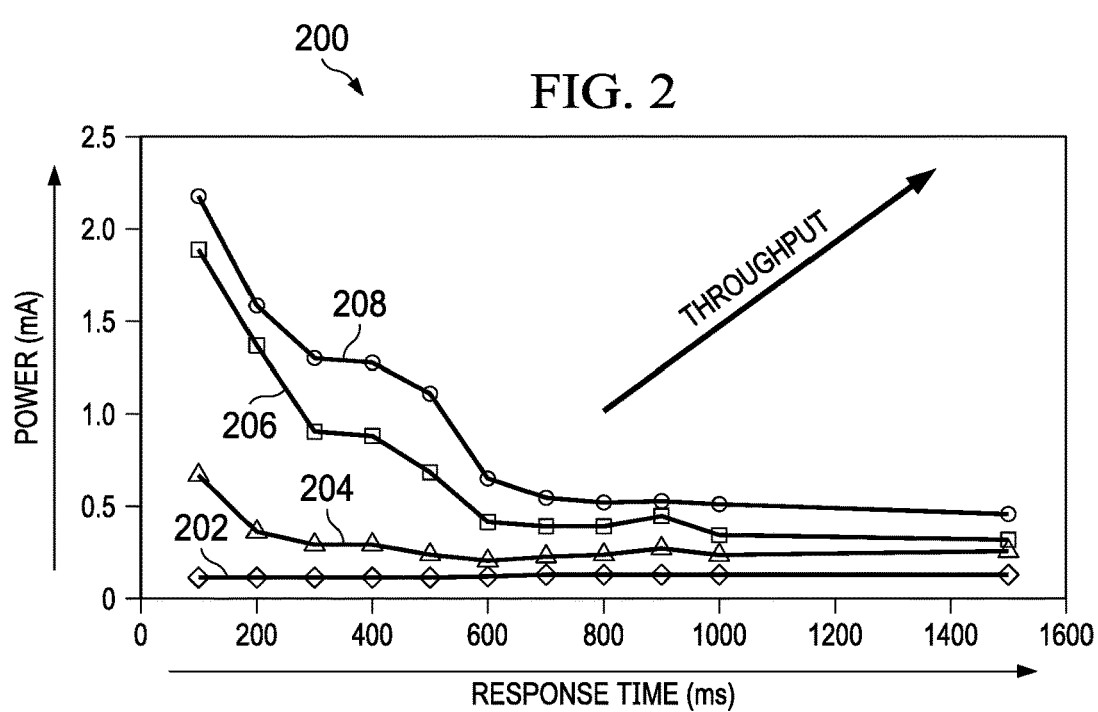
FIG. 2 is a graph of power consumption and response time for a set of power policies in accordance with various examples.

FIG. 2 is a graph 200 of power consumption and response time for a set of power policies in accordance with various examples herein. Graph 200 shows one example of four operating conditions (e.g., throughput boundaries in this example), but other operating conditions may be present in other examples. On graph 200, the y-axis indicates power while the x-axis indicates response time. Power on the y-axis is represented by average current in milliamps (mA), which is proportional to power consumption. Response time on the x-axis is depicted in milliseconds. Graph 200 includes curves 202, 204, 206, and 208. Curves 202, 204, 206, and 208 represent different operation conditions for an example device, such as device 104. As shown in graph 200, higher power consumption is generally associated with lower response times. As response times increase, power consumption is reduced. In addition, graph 200 shows the throughput that may be achieved during the various operating conditions for an example device. Graph 200 therefore shows the relationship between power, response time, and throughput. Adjusting any of these three variables affects the other two variables. These relationships are used to create policies, respond to queries, and generate responses to events.

Figure 3:
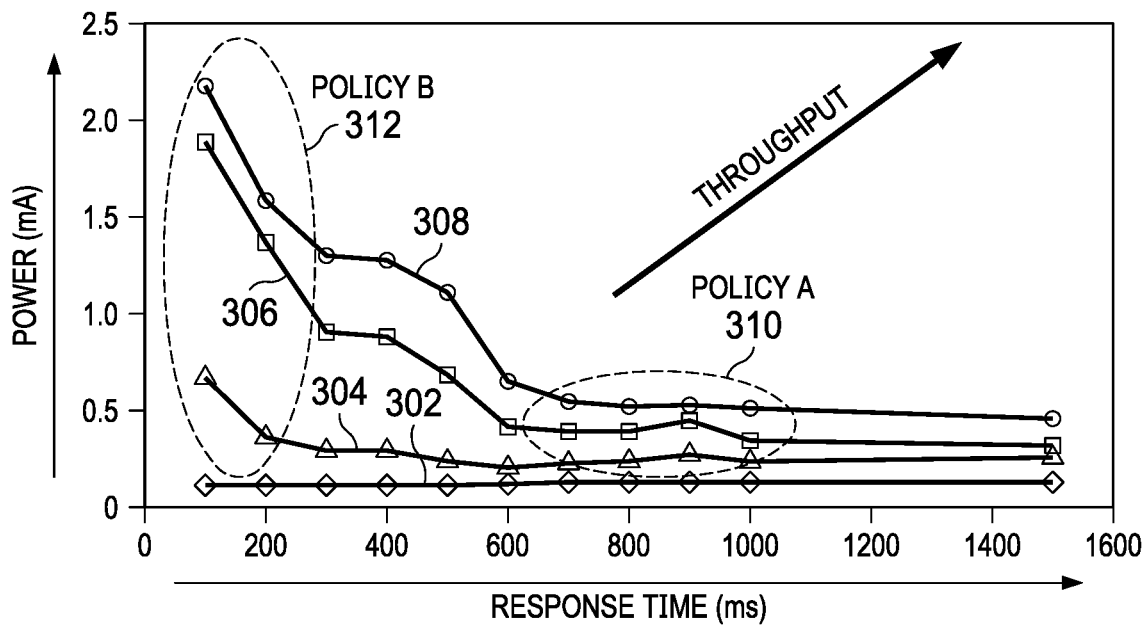
FIG. 3 is a graph of power consumption and response time for a set of power policies in accordance with various examples.

FIG. 3 is a graph 300 of power consumption and response time for a set of power policies in accordance with various examples herein. Graph 300 is similar to graph 200, and shows one example of four operating conditions, but other operating conditions may be present in other examples. On graph 300, the y-axis indicates power while the x-axis indicates response time. Power on the y-axis is represented by average current in milliamps (mA), which is proportional to power consumption. Response time on the x-axis is depicted in milliseconds. Graph 300 includes curves 302, 304, 306, and 308. Curves 302, 304, 306, and 308 represent different operation conditions for an example device, such as device 104. Graph 300 also includes policy A 310 and policy B 312, shown as dotted lines in graph 300. Policy A 310 uses less power, but has a slower response time (e.g., a policy that represents maintaining a power restriction by limiting the maximum throughput). Policy B 312 has a faster response time, but uses more power (e.g., a policy that limits the maximum responsiveness without limiting the power). Policies may have constraints, such as maintaining a certain throughput regardless of power consumption, or maintaining a certain power consumption regardless of throughput. In other example, other boundaries of performance may be used. Graph 300 is a visual representation of policies that are managed by an entity coordinator, such as entity coordinator 120 in FIG. 1. Entity coordinators manage the policies for a user, and provide simple responses and options for a user to manage power consumption based on relationships between operating variables, such as those relationships shown in graph 300.

Figure 4:
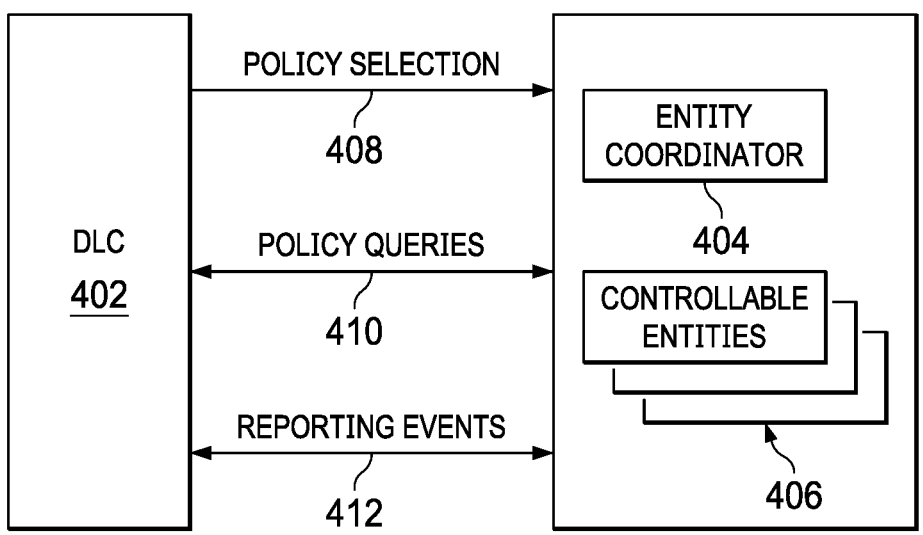
FIG. 4 is a system for communication between a device level coordinator and an entity coordinator in accordance with various examples.

FIG. 4 is a system 400 for communication between a DLC and an entity coordinator in accordance with various examples. System 400 includes DLC 402, entity coordinator 404, and controllable entities 406. System 400 also includes policy selection 408, policy queries 410, and reporting events 412. In system 400, DLC 402 may be DLC 116 in FIG. 1. Entity coordinator 404 may entity coordinator 120 in FIG. 1. Controllable entities 406 may be controllable entities 122 in FIG. 1. DLC 402, entity coordinator 404, and controllable entities 406 may operate similarly to their counterpart components in FIG. 1.

System 400 provides examples of the communications between DLC 402 and entity coordinator 404 in accordance with various examples. For example, a user may use DLC 402 to select a power policy via policy selection 408. Policy selection 408 may be a power policy selection API in one example. A user or application may select between several different power policies and/or different power consumption levels. In some examples, entity coordinator 404 may accept, modify, or reject a power policy selection. For example, if the operating conditions of a device changes, some power policies may not be able to be implemented. Entity coordinator 404 may then modify or reject a power policy selection, and may send a report to the user indicating the same. DLC 402 uses the policy to enforce the performance boundaries set by the policy. For example, if the policy restricts power consumption below a certain predetermined threshold, DLC 402 works with entity coordinator 404 to manage components and activities of a device such as device 104 to maintain the power consumption below the predetermined threshold. If the policy guarantees a certain throughput, DLC 402 and entity coordinator 404 manage components and activities of the device to maintain the guaranteed throughput.

System 400 also shows the policy queries 410 (and associated responses) communicated between DLC 402 and entity coordinator 404. Users or applications may send queries to alter the policy, change to a different policy, or adjust the policy temporarily. Queries may also be used to determine the effect of various proposed changes. For example, a user may want to know the expected power consumption if the throughput of the controlled device is increased. The controllable entities 406 may provide this information to entity coordinator 404 in response to the query. The response may be provided to the user. The response may include the performance results associated with the change. The response may include a recommended updated power policy in some examples. The queries allow the user to receive performance information in an easy to understand format without requiring the user to be familiar with the technical workings of the device.

System 400 also shows reporting events 412. Events are described above with respect to FIG. 1. Events may be generated in response to a variety of situations. An event may be generated if an operating condition, such as power consumption, nears or exceeds a boundary. In another example, if throughput falls below a selected minimum limit, an event may be generated.

The event may be reported from entity coordinator 404 to DLC 402, and then to a user. The report may also provide a recommended action or updated policy, in some examples. The report may provide the user with a selection of possible actions in some examples.

Figure 5:
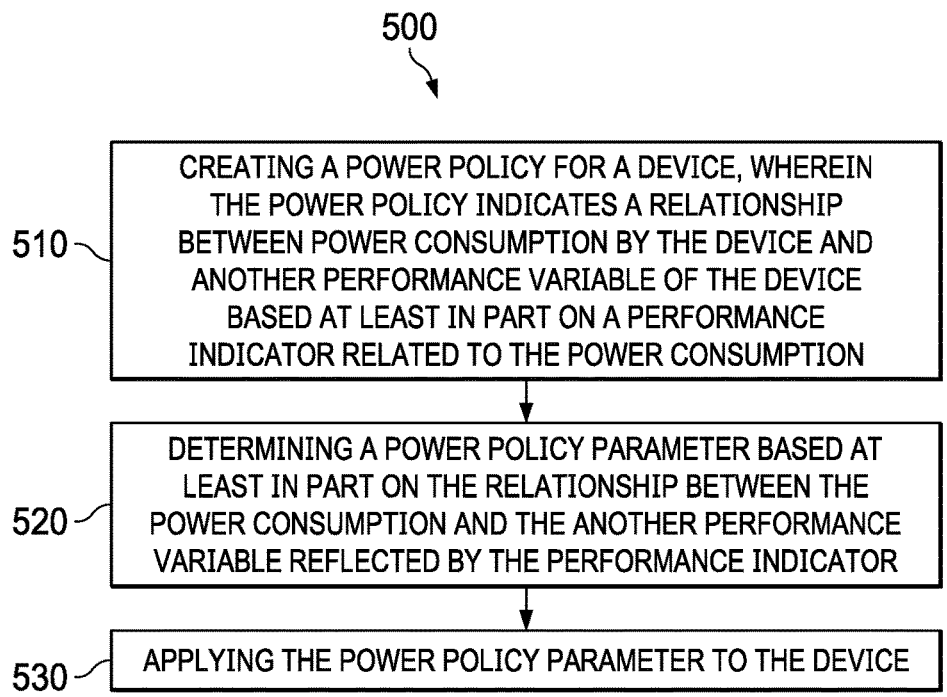
FIG. 5 is a flow diagram of a method for multi-level power management in accordance with various examples.

FIG. 5 is a flow diagram of a method 500 for multi-level power management in accordance with various examples herein. The steps of method 500 may be performed in any suitable order. The hardware components described above with respect to FIGS. 1 and 4 may perform method 500 in some examples.

Method 500 begins at 510, where a power policy for a device is created. The power policy indicates a relationship between power consumption by the device and another performance variable of the device based at least in part on a KPI related to the power consumption. The power policy may include any power-related information as described above. The other performance variables may be speed, response time, throughput, transmit time, transmit range, receive time, running processes, or any other suitable variables.

Method 500 continues at 520, where a processor or controller determines a power policy parameter based at least in part on the relationship between the power consumption and the another performance variable reflected by the KPI. The power policy parameters may be operating points, envelopes, or boundaries for performance characteristics, such as minimum speed or throughput, maximum power consumption, minimum or maximum responsiveness, minimum processing accuracy, or any other parameters, limits, or boundaries for any other performance characteristics. The power policy parameters may also include power versus accuracy, frequency of data collection, transmit power versus transmit range, connectivity topology, current running services, speed, frequency, throughput, responsiveness, transmit time, receive time, processing accuracy, peripheral handling, and/or sensor monitoring. The KPIs may reflect short and long-term impacts on power consumption and power consumption-related performance of the device. The KPIs may indicate how changes to the power policy parameters or performance characteristics of the device (e.g., speed, throughput, transmit power, running services, responsiveness, processing accuracy, peripheral handling, sensor monitoring, etc.) affect power consumption of the device.

Method 500 continues at 530, where a processor or controller applies the power policy parameter to the device. Setting the power policy parameter may set an operating point, envelope, or boundary for a performance characteristic of the device. The behavior of the device may be changed based at least in part on the power policy parameter.

In other examples, a query regarding the power policy may be received from a user. A response to the query may be determined based at least in part on the relationship between power consumption and the other performance variable. An entity coordinator, such as entity coordinator 120, may provide a response to the query. The response is based on information the entity coordinator receives from controllable entities 122 and other sources. The response may be based on certain KPIs in some examples.

Also, an entity coordinator, such as entity coordinator 120, may provide a response to the query in some examples. The response to the query may be provided to a device level coordinator such as DLC 116 in one example. DLC 116 may then provide the response to a multi-device coordinator, such as MDC 110 in some examples. In other examples, the response may be provided to a user by DLC 116, or to another application. The user may be given a choice of options and may take an appropriate action based on the response in some examples.

Figure 6:
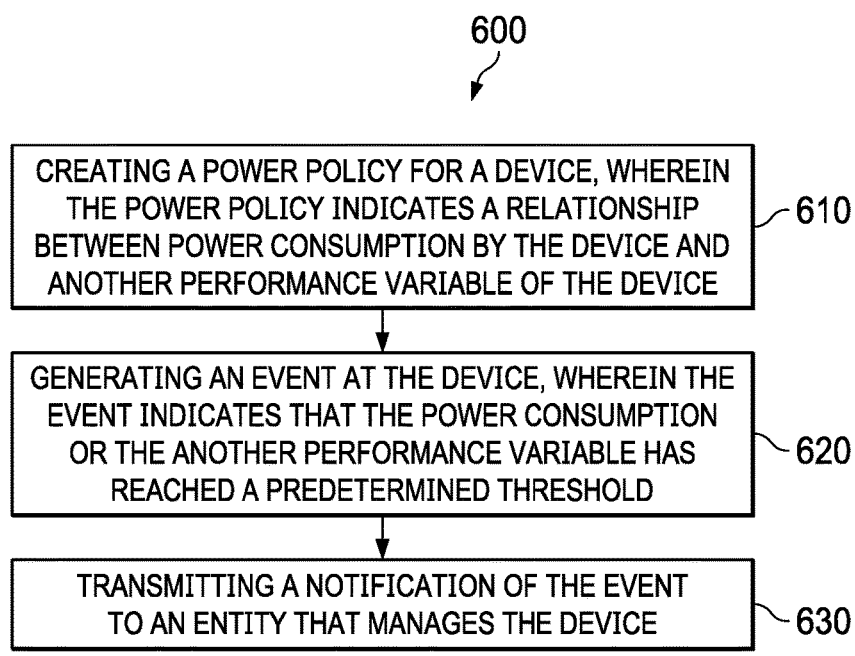
FIG. 6 is a flow diagram of a method for multi-level power management in accordance with various examples.

FIG. 6 is a flow diagram of a method 600 for multi-level power management in accordance with various examples herein. The steps of method 600 may be performed in any suitable order. The hardware components described above with respect to FIGS. 1 and 4 may perform method 600 in some examples.

Method 600 begins at 610, where a power policy is created for a device, and where the power policy indicates a relationship between power consumption by the device and another performance variable of the device. The power policy may include any power policy parameters as described above. The other performance variables may be speed, response time, throughput, transmit time, transmit range, receive time, running processes, or any other suitable variables.

Method 600 continues at 620, where an event is generated at the device, where the event indicates that the power consumption or the another performance variable has reached a predetermined threshold. The predetermined threshold may be indicative of the power policy parameters of the device based on the power policy. For example, a power policy parameter may indicate a maximum power consumption for the device. As the device approaches or exceeds the maximum power consumption, an event is generated. The predetermined thresholds may be set for any performance variable of the device, and may be set to any suitable level. Compound thresholds may also be set, where more than one performance variable has to reach a threshold before an event is reached in some examples. The predetermined thresholds may be minimum or maximum values for the performance variables. For example, one threshold may be a minimum transmit range, while another threshold is a maximum transmit range. If the transmit range is either below the minimum or above the maximum, the event is generated.

Method 600 continues at 630, where a notification of the event is transmitted to an entity that manages the device. The notification may be transmitted to a device level coordinator such as DLC 116 in one example. The notification may be transmitted to a multi-device coordinator such as MDC 110 in another examples. The notification may be provided to a user or to another application. The user may take any of a number of actions after receiving the notification, including submitting a query, selecting a different power policy, altering the power policy, or altering the performance variables of the device, such as power consumption, speed, transmit range, throughput, etc.

In examples herein, a user is provided the opportunity to dynamically select a power consumption-related working profile that improves power consumption and/or power consumption-related performance based on the user's own criteria. Examples herein enable a user to tune device power consumption and power consumption predictions. Examples herein provide the user with an understanding of the effects of the user's choices on power consumption and other power consumption-related performance variables. The user may create a specific real-time operation profile based on a target KPI. The examples herein may be implemented at multiple levels, including at the device level and/or the network level.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Elements of the management operation framework disclosed herein may use any combination of dedicated hardware and instructions stored in a non-transitory medium. The non-transitory medium includes all electronic mediums or media of storage, except signals. Accordingly, elements of the management operation framework, including device 104 and management entity 102, may include a processing resource coupled to a non-transitory computer-readable medium. The processing resource may include one or more microcontrollers, application-specific integrated circuits (ASICs), CPUs, GPUs, and/or other processing resources configured to execute instructions stored on the medium. Examples of suitable non-transitory computer-readable media include one or more flash memory devices, battery-backed RAM, SSDs, hard disk drives (HDDs), optical media, and/or other memory devices suitable for storing the instructions for the processing resource.

Unless otherwise stated, "about," "approximately," or "substantially" preceding a value means +/−10 percent of the stated value. Modifications are possible in the described examples, and other examples are possible within the scope of the claims.

What is claimed is:

1. A method, comprising:
    creating a power policy for a first device, wherein the power policy for the first device indicates a relationship between power consumption by the first device and another performance variable of the first device based at least in part on a performance indicator related to the power consumption, and wherein the another performance variable includes a response time of the first device or a throughput of the first device;
    determining a power policy parameter based at least in part on the relationship between the power consumption and the another performance variable reflected by the performance indicator;
    applying the power policy parameter to the first device;
    receiving a query regarding the power policy for the first device from a user external to the first device, wherein a management entity provides the query to the first device and to a second device;
    determining responses to the query at the first device and at the second device, wherein the responses are based at least in part on the relationship between the power consumption and the another performance variable, and wherein the responses include a first projection of the power consumption at a first time based on applying the power policy parameter, a second projection of the power consumption at a second time after the first time based on applying the power policy parameter, a first projection of the another performance variable at the first time based on applying the power policy parameter, and a second projection of the another performance variable at the second time;
    providing the responses to the query to the user, wherein the responses include an option to modify the power policy for the first device;
    creating an altered power policy based on input from the user after the responses; and
    enforcing the altered power policy on the first device, including managing a component of the first device and an activity of the first device to affect the power consumption.

2. The method of claim 1, further comprising:
    changing a behavior of the first device based at least in part on the power policy parameter.

3. The method of claim 1, wherein the power policy for the first device indicates a relationship between the power consumption, a response time of the first device, and a throughput of the first device.

4. The method of claim 1, wherein determining the responses to the query includes determining the performance indicator related to the power consumption.

5. The method of claim 1, wherein the power policy for the first device is a first power policy, and the responses to the query includes an option to implement a second power policy.

6. A method, comprising:
    creating a power policy for a first device, wherein the power policy for the first device includes a power policy parameter based on a relationship between power consumption by the first device and another performance variable of the first device, and wherein the another performance variable includes a response time of the first device or a throughput of the first device;
    generating an event at the first device, wherein the event indicates that the power consumption or the another performance variable has reached a predetermined threshold;
    transmitting a notification of the event to a management entity that manages the first device, the management entity being external to the first device;
    receiving a query regarding the event from the management entity, wherein the query is provided to the first device and to a second device;
    determining responses to the query at the first device and at the second device, wherein the responses are based at least in part on the relationship between the power consumption and the another performance variable, and wherein the responses include a first projection of the power consumption at a first time based on applying the power policy parameter, a second projection of the power consumption at a second time after the first time based on applying the power policy parameter, a first projection of the another performance variable at the first time based on applying the power policy parameter, and a second projection of the another performance variable at the second time;
    providing the responses to the query; and
    implementing a second power policy for the first device based at least in part on the event, including managing a component of the first device and an activity of the first device to affect the power consumption.

7. The method of claim 6, further comprising:
receiving a command to cross the predetermined threshold for the power consumption or the another performance variable.

8. A system, comprising:
a first processor in a first device, the first processor configured to:
  access a power policy for the first device, wherein the power policy for the first device includes a power policy parameter based on a relationship between power consumption by the first device and another performance variable of the first device, and wherein the another performance variable includes a response time of the first device or a throughput of the first device;
  produce an operating point for the first device based at least in part on the power policy for the first device;
  provide information regarding the operating point to a management entity that manages the first device, the management entity being external to the first device;
  receive a query regarding the power policy for the first device from the management entity, wherein the query is provided to the first device and to a second device;
  determine a response to the query at the first device based at least in part on the relationship between the power consumption and the another performance variable, wherein the responses include a first projection of the power consumption at a first time based on applying the power policy parameter, a second projection of the power consumption at a second time after the first time based on applying the power policy parameter, a first projection of the another performance variable at the first time based on applying the power policy parameter, and a second projection of the another performance variable at the second time; and
  provide the response to the query to the management entity, wherein the response includes an option to modify the power policy
  creating an altered power policy based on input after the response; and
  enforcing the altered power policy on the first device, including managing a component of the first device and an activity of the first device to affect the power consumption; and
a second processor in the second device, the second processor configured to:
  receive the query regarding the power policy for the first device from the management entity;
  determine a response to the query at the second device; and
  provide the response to the query to the management entity.

9. The system of claim 8, wherein the power policy includes a relationship between the power consumption and a frequency of data collection.

10. The system of claim 8, wherein the first processor is also configured to generate a performance indicator based on the power consumption of the first device.

11. The system of claim 8, wherein the first processor is also configured to generate an event, wherein the event indicates that the power consumption or another variable has reached a predetermined threshold.

12. The method of claim 1, wherein the second device is external to the first device, the method further comprising, in response to the query, retrieving from the first and second devices first information regarding power consumption and power policy parameters of the first and second devices, and providing the first information to the user.

13. The method of claim 1, wherein the user comprises the management entity.

14. The method of claim 1, wherein receiving the query comprises receiving the query using a power policy query application programming interfaces (API).

15. The method of claim 1, further comprising:
generating an event indicating that the power consumption or the another performance variable has reached a predetermined threshold; and
transmitting a notification of the event to a management entity that manages the first device.

16. The system of claim 8, wherein the power policy for the first device indicates a relationship between the power consumption, transmit time, and transmit range.

17. The method of claim 1, wherein the first device comprises a sensor, a light, a camera, or a speaker.

18. The system of claim 8, wherein the system is a home automation system, and wherein the management entity comprises a hub or access point.

19. The method of claim 1, wherein the power policy for the first device indicates a relationship between the power consumption, transmit time, and transmit range.

20. The method of claim 6, wherein the power policy for the first device indicates a relationship between the power consumption, transmit time, and transmit range.

21. The method of claim 1, wherein the responses include an option to modify a power policy for the second device.

22. The method of claim 6, further comprising:
modifying a power policy for the second device based at least in part on the event.

* * * * *